INVENTORS.
KENNETH V. HARDMAN &
ALFRED J. ANDERSON

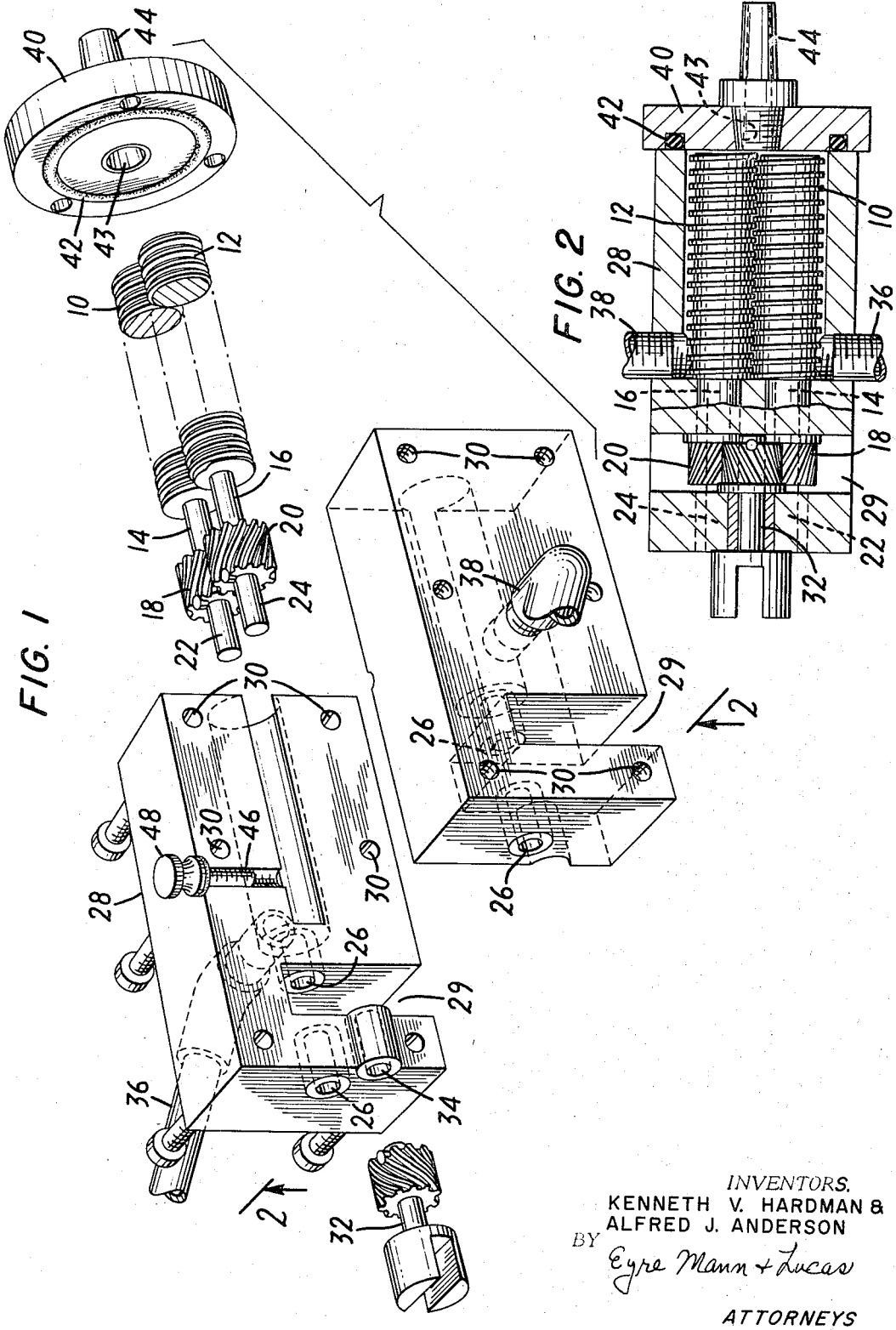

ATTORNEYS

United States Patent Office 3,373,903
Patented Mar. 19, 1968

3,373,903
SELF-PURGING MIXING AND
DISPENSING APPARATUS
Kenneth V. Hardman, Upper Montclair, and Alfred J.
Anderson, Livingston, N.J., assignors to Hardman
Incorporated, a corporation of New Jersey
Filed May 20, 1966, Ser. No. 551,663
10 Claims. (Cl. 222—142)

ABSTRACT OF THE DISCLOSURE

A mixing and dispensing apparatus is provided with two or more rotatable, screw-threaded rods mounted within a closely adjacent housing, the screw threads of each rod being interleaved with those of the adjacent rod. As the rods are rotated, two or more liquids are flowed at different points into the space between the housing and screw-threads, and thereby the liquids are uniformly admixed and advanced under positive pressure out through a discharge opening. Continued rotation of the rods with cessation of the liquid flow purges the space between the housing and the screw-threads of liquid residue, and this is aided by venting the space to the atmosphere to eliminate the pulling of vacuum or cavitation of liquids within the interior of the apparatus.

---

This invention relates to a mixing and dispensing apparatus for flowable liquids. More particularly, the invention provides an apparatus in which two or more flowable liquids may be thoroughly admixed and dispensed with a positive metering action, and which is self-cleaning in that liquids may be purged from the apparatus without disassembly thereof.

Many useful compositions are made of liquid ingredients which are flowable, and which must be thoroughly admixed prior to use. In some cases, such as epoxy resins, the compositions are reactive. That is, as soon as the liquid ingredients are brought into contact with each other, the shelf life of the composition is limited since the ingredients begin to react with each other. Some epoxy resins will react and set up into a hard, infusible material within fifteen minutes after mixing. Thus, there is a need for a lightweight, portable dispensing apparatus, which can thoroughly admix flowable liquids and provide a positive metering action to dispense the admixed composition.

In accordance with the present invention an apparatus has now been devised in which flowable liquids can be thoroughly admixed and dispensed with controlled positive metering action. Aside from its excellent admixing and dispensing action, additional important advantages of the apparatus are that it is portable, lightweight, versatile and self-cleaning. Thus, the apparatus can be cleaned and purged free of admixed reactive composition without disassembling it. This is of great advantage, particularly in the case of reactive compositions, since if such compositions are permitted to remain in a mixing apparatus and set up, internal parts will become "frozen" or bonded to each other and thereby broken or damaged. In the apparatus of the present invention, there is no danger of internal parts freezing up since the apparatus can be completely purged after each use and thereby prepared for renewed operation without any difficulties.

Another important advantage of the apparatus is that the flow of admixed liquid composition from its outlet opening is stopped substantially instantaneously, without any after ooze or drip, as soon as operation of the apparatus is discontinued. Such a sharp cut-off in the dispensing action was completely surprising and unexpected and further illustrates the positive metering effect that is embodied in the apparatus. Thus, during its operation, the apparatus gives controlled positive flow of admixed liquid compositions and such flow is immediately stopped when the operation is discontinued. Such an advantage materially increases the control and facility with which the apparatus can be used, especially in hand-held applications, and thereby makes the invention all the more valuable.

In general, the apparatus of the invention comprises two or more rod elements each having an external screw thread. These rod elements are mounted adjacent each other within an housing having a smooth inner wall which is closely spaced and adjacent to the external screw threads of the rod members. The screw threads of the rod members are interleaved in the mounted position within the smooth-walled housing. A plurality of inlet passages are provided in the housing, there being at least one inlet passage for each liquid that is to be admixed, and these inlet passages empty into different entrance points in the space between the interior smooth wall of the housing and the external screw threads, at one end of the rod members. In this way liquids are separately delivered into the working space of the apparatus through the separate inlet passages.

The screw threads of each rod member are the same in pitch, inclination and direction. The rod members are then rotated in the same direction during operation of the apparatus whereby the liquids entering through the inlet passages are forced to admix and advance from the point of entry towards the opposite ends of the rod members under a positiv metering action. At the opposite end of the rod member, an outlet passage communicates with the rod members, whereby the admixed advanced liquid composition is discharged through the outlet passage.

In normal operation, liquids are forced to flow through the inlet passages into the apparatus under a slight positive pressure. After the desired amount of liquids has been admixed and dispensed, this pressure is discontinued and rotation of the rod members is continued. As a result of the positive metering action provided by the apparatus, the liquid remaining in the working space between the inner wall and the screw threads of the rod members is forced out through the outlet passage and the apparatus becomes purged.

In order to enhance this self-purging action and achieve the best results, a separate air passage is provided in the housing leading to the vicinity of the entrance points of the liquid inlet passages. Means are provided for closing or opening this separate passage at any desired time whereby air may be admitted into the interior of the apparatus. Thus, when liquids have been admixed and dispensed, the air passage is opened whereby the fluid pressure within the apparatus is broken and air is pulled in to the apparatus to allow all remaining admixed composition to advance along the screw threads of the rod members and be discharged through the outlet passage. This action may be even further enhanced by admitting solvent or other cleaning liquid through the air passage whereby the last traces of any admixed composition in the space between the inner wall of the housing and the screw threads can be flushed out as the rod members are rotated.

The apparatus of the invention has particular utility for admixing flowable viscous liquids such as curable epoxy resins and liquid catalysts therefor, polysulfides, depolymerized rubbers, urethanes and their respective curing agents. Such materials require a thorough and accurate admixture of the individual liquid ingredients in order to secure the maximum benefits they can provide, and with the apparatus of the invention large quantities of resin (Part A) and catalyst (Part B) may be thoroughly and accurately mixed and dispensed with great control and ease. In particular, the apparatus of the present invention may be used as the mixing and dispensing chamber of a portable caulking gun device for dispensing epoxy resin such as disclosed in U.S. Patent 3,187,951. The apparatus is of great value also in mixing, metering equipment of a heavy or stationary nature and in mobile mixing-metering equipment for adhering highway reflectors on ramps and thruways.

Further details of the invention will be readily understood by reference to the accompanying drawings which illustrate two embodiments of the invention and of which, FIG. 1 is an exploded perspective view of one embodiment of the invention.

FIG. 2 is a sectional view of the assembled apparatus of FIG. 1 taken generally along line 2—2 of FIG. 1.

Figure 3:
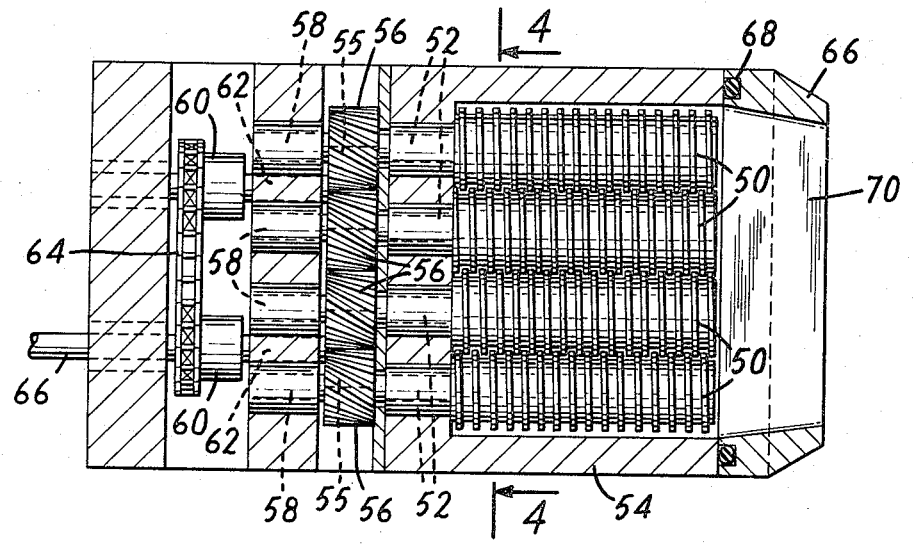
FIG. 3 is a sectional view similar to FIG. 2 showing a second embodiment of the invention.

Referring now to FIG. 1 the apparatus of the present invention includes two rod members 10 and 12 each having an external screw thread which is the same as to inclination, pitch and direction. Rod members 10 and 12 have reduced shank portions 14 and 16 and then enlarged driven portions 18 and 20 which are in the form of helical gears. The helical gear portions 18 and 20 are integral with the terminating reduced shank portions 22 and 24 which are similar to shank portions 14 and 16. The shank and terminating portions 14, 16, 22 and 24 are rotatably supported in bearings 26 in a housing 28.

The housing 28 is in two parts and held together by means of bolts which are passed through bolt holes 30. The interior of the housing is in the form of a smooth-walled figure-eight bore which is adapted to receive the screw threaded portions of rod members 10 and 12 as can be seen from FIG. 2. The housing 28 includes a rectangular recess 29 which is adapted to receive the helical gear portions 18 and 20 of the rod members 10 and 12. A drive rod gear member 32 is supported in a third bearing 34 and engages the helical gears 18 and 20 in the rectangular recess of housing 28 to drive the rod members 10 and 12 in the same direction. Two separate inlet passages 36 and 38 lead into the space between the interior wall of the housing 28 and the external screw thread of the rod members 10 and 12. The entrance points of the inlet passages 36 and 38 are at the sides of the rod members 10 and 12 opposite the sides which are interleaved as to the screw threads thereof.

Referring to FIG. 2, it will be seen that the interior wall of the housing 28 and the external screw thread of rod members 10 and 12 are separated by a very narrow working space. The inlet passages 36 and 38 lead to this space and empty into diametrically opposite entrance points in the space at one end of the rod members 10 and 12. At the opposite end of the rod members 10 and 12 a plate 40 is provided with a gasket 42, and the plate 40 is detachably secured to the front end of the housing 28 by means of bolts (not shown). The plate 40 has a central outlet passage 43 which leads from the rod members 10 and 12 to the nozzle 44, from which admixed reactive composition may be discharged.

As shown in FIG. 1, a separate air passage 46 leads down into the space between the interior wall of the housing 28 and the screw threads of rod members 10 and 12 and this passage 46 is sealed by means of the screw threaded nut 48.

In operating the apparatus of FIGS. 1 and 2, flowable liquids desired to be admixed are caused to flow through the inlet passages 36 and 38 into the space between the interior wall of the housing 28 and the rod members 10 and 12. The drive shaft gear member 32 is rotated whereby the rod members 10 and 12 become rotated in the same direction by means of the helical gears 18 and 20. The liquids entering through the passages 36 and 38 thereby are caused to admix and advance up along the screw threads of rod members 10 and 12 towards the outlet opening 43. The mixing action is thorough and complete by the time the fluids reach the outlet opening 43 from whence they exit from the apparatus through nozzle 44. When sufficient reactive admixed composition has been discharged through nozzle 44, the nut 48 is opened to permit air to enter through the passage 46. This breaks the fluid pressure existing in the lines 36, 38 and the working space between the inner wall of the housing 28 and the rod members 10 and 12. As a result, upon continued rotation of the rod members 10 and 12, the remaining admixed composition in the interior of the apparatus is forced out through the outlet opening 43 and the nozzle 44 whereby the apparatus is purged. In the event even more complete cleaning is desired, a small amount of solvent may be introduced into the interior of the apparatus through the passage 46 and this solvent also will be flushed out of the apparatus, carrying with it any admixed composition through the positive metering action that is given by the rod members 10 and 12.

Referring now to FIG. 3, a second embodiment of the invention is there illustrated in which four rod members 50 are employed each having an external screw thread the same in pitch, inclination and direction as the others. The rod members 50 are mounted in such position that the axes of rotation thereof are aligned in a common plane (see FIG. 4). The rod members 50 have reduced shank portions 52 which are carried in bearings in an outer housing 54. The reduced shank portions 52 are connected to helical gear portions 56 and these in turn are integral with reduced shank portions 58 which also are carried in bearings within the external housing 54. Each adjacent pair of the helical gears 56 is driven by drive shafts 60 which also are supported in bearings 62 in the housing 54 and which terminate in helical gear portions 55 which engage the helical gear portions 56. The drive portions 60 are connected by a chain drive 64 whereby the entire train of rod members 50 may be driven from a single drive rod 66. At the opposite ends of the rod members 50 a plate 66 is provided with a gasket seal 68. The plate 66 contains an outlet passage 70 which terminates in an elongated narrow slit and communicates with all of the ends of the rod members 50 whereby admixed composition discharges through the outlet passage in the form of a thin ribbon.

Figure 4:
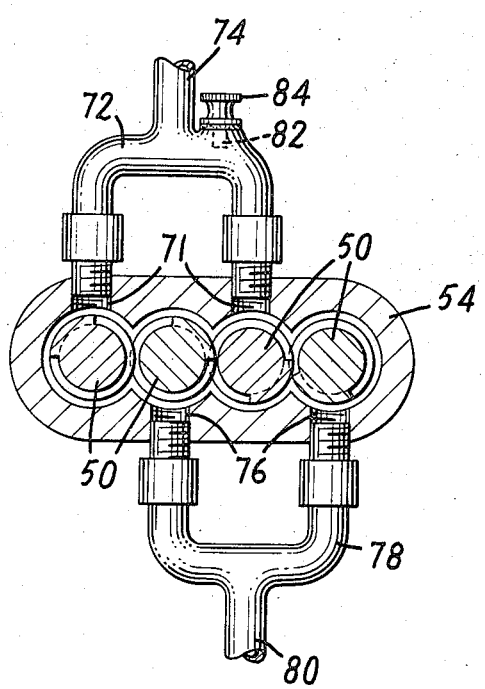
FIG. 4 is a sectional view taken along line 4—4 of FIG. 3.

Referring now to FIG. 4, a pair of inlet passages is provided for alternate pairs of the rod members 50. Thus, the inlet passages 71 lead into the space between the interior wall of the housing 50 and the first and third rod members 50 reading from the left. The inlet passages 70 are connected to a manifold 72 into which an inlet passage 74 leads and branches to feed both inlet passages 71. Likewise, a pair of inlet passages 76 lead into the space between the interior wall of the housing 54 and the second and fourth rod members 50, with the inlet passages 76 being connected to a manifold 78 into which the passage 80 leads and branches to feed both inlet passages 76.

The manifold 72 contains an additional inlet passage 82 which is sealed by the nut 84. This provides a means for breaking the liquid pressure within the interior of the apparatus in a manner analogous to the nut 48 and passage 46 described in connection with FIG. 1. If desired an inlet passage for air may also be provided in the manifold 78 although this is not actually necessary.

Operation of the embodiment of the invention shown in FIGS. 3 and 4 is similar to the previous embodiment. Flowable liquids are caused to flow through the passages 74 and 71 on the one hand and 80 and 76 on the other, the liquids being different in the respective cases. The rod members 50 are rotated whereby the incoming liquids are thoroughly admixed and caused to advance towards the outlet passage 70 from whence the admixed composition exits in the form of a thin flat ribbon. When sufficient material has been dispensed, the nut 84 is opened whereby air enters through passage 82, breaks the fluid pressure within the interior of the apparatus and any admixed composition therein is purged and flushed out of the apparatus by continued rotation of the rod members 50. If desired, solvent or other liquid can again be injected through the passage 82 to achieve even further cleaning.

The invention has now been described in terms of its operating principles and two specific embodiments. The invention provides a positive metering apparatus which can accurately admix and dispense many different types of flowable liquid materials. The dispensing action is controlled and allows the user to place admixed reaction compositions exactly upon a target area, discontinue applying the material whenever he chooses and then immediately purge the apparatus to prepare for renewed operation without any problems. The invention has particular utility for admixing reactive compositions such as epoxy resins. However, as noted above, the apparatus may be used in connection with many different types of flowable liquid compositions, other specific examples being urethane compositions, depolymerized rubbers and polysulfides. Also, while best results are achieved with screw threads which are the same on the rod members of the apparatus, opposite screw threads can be used with the rod members being rotated in opposite direction, although the results will not be as beneficial.

It will be understood that it is intended to cover all changes and modifications of the preferred embodiments of the invention, herein chosen for the purpose of illustration, which do not depart from the spirit and scope of the invention.

We claim:

1. A self-purging mixing and dispensing apparatus for admixing two or more flowable liquids and dispensing the resulting admixture thereof which comprises at least two rod members each of which has an external continuous screw thread, said rod members being mounted adjacent each other with the screw threads thereof interleaved within an housing having a smooth inner wall which is adjacent and slightly spaced from said screw threads, separate inlet passages extending through said housing to different entrance points in the space between said screw threads and said smooth inner wall at one end of said rod members, there being at least one said inlet passage for each liquid which is to be admixed, an outlet passage communicating with the opposite end of said rod members for dispensing an admixture of said liquids, and means for rotating said rod members to cause liquids admitted from said inlet passages into the space between said screw threads and said smooth inner wall to admix and advance towards and out through said outlet passage under positive pressure exerted upon said liquids by said rotating screw-threads, whereby continued rotation of said rod members and cessation of liquid flow from said inlet passages will effect purging of liquids from the space between said screw threads and said smooth inner wall.

2. A self-purging mixing and dispensing apparatus for admixing two or more flowable liquids and dispensing the resulting admixture thereof which comprises at least two rod members each of which has an external screw thread, said rod members being mounted adjacent each other with the screw threads thereof interleaved within an housing having a smooth inner wall which is adjacent and slightly spaced from said screw threads, separate inlet passages extending through said housing to different entrance points in the space between said screw threads and said smooth inner wall at one end of said rod members, there being at least one said inlet passage for each liquid which is to be admixed, an outlet passage communicating with the opposite end of said rod members for dispensing an admixture of said liquids, means for rotating said rod members to cause liquids admitted from said inlet passages into the space between said screw threads and said smooth inner wall to admix and advance towards and out through said outlet passage under positive pressure exerted upon said liquids by said rotating screw-threads, and an air passage which may be opened and closed at any desired time to admit and seal out ambient air respectively in the vicinity of said inlet passages, whereby continued rotation of said rod members and cessation of liquid flow from said inlet passages, aided by admission of air in the vicinity thereof, will effect purging of liquids from the space between said screw threads and said smooth inner wall.

3. An apparatus as in claim 2 wherein said screw threads are the same in pitch, inclination and direction, and said rotation means rotate said rod members in the same angular direction.

4. An apparatus as in claim 2 having two said rod members and two said inlet passages, said two inlet passages extending to entrance points which are located respectively at the sides of said rod members opposite the sides where the screw threads thereof are interleaved.

5. An apparatus as in claim 2 wherein said outlet passage is contained within a plate and nozzle member which is detachably secured to said housing.

6. An apparatus as in claim 2 wherein said air passage extends through said housing to an entrance point near the entrance points of said inlet passages in the space between said screw threads and said smooth inner wall, said air passage being sealed at the outer surface of said housing.

7. An apparatus as in claim 2 having four said rod members mounted such that the axes of rotation thereof are aligned in a common plane, said four rod members having screw threads which are the same in pitch, inclination and direction, and said rotation means including a single drive shaft coupled to said four rod members to rotate said members in the same angular direction.

8. An apparatus as in claim 7 wherein said outlet passage is contained within a plate and nozzle member which is detachably secured to said housing, said nozzle having an elongated narrow slit from which a thin ribbon of said admixture of fluids is dispensed.

9. An apparatus as in claim 7 having two pairs of said inlet passages, one of said pairs extending through said housing to entrance points adjacent the first and third of said rod members and the other pair extending through said housing to entrance points adjacent the second and fourth of said rod members, a manifold affixed to the exterior of said housing in relation to each said pair of inlet openings, each said manifold having a fluid inlet passage and branch passages which connect to each said pair of inlet passages whereby each of the liquids to be admixed may be flowed through each said manifold.

10. An apparatus as in claim 9 wherein at least one of said manifolds includes an air passage extending to the interior flow passages thereof and being sealed at the exterior of said manifold.

References Cited

UNITED STATES PATENTS

| | | | |
|---|---|---|---|
| 999,297 | 8/1911 | Carter | 222—142 |
| 1,027,334 | 5/1912 | Hetherington | 222—142 X |
| 1,271,107 | 7/1918 | Weller | 222—148 |
| 2,907,499 | 10/1959 | Agronin | 222—194 X |
| 2,973,120 | 2/1961 | Stevenson et al. | 222—271 X |
| 3,042,264 | 7/1962 | Trumbull et al. | 222—142 |
| 3,258,159 | 6/1966 | Neville et al. | 222—194 X |

SAMUEL F. COLEMAN, *Primary Examiner.*

RAPHAEL M. LUPO, *Examiner.*